US008819159B2

(12) United States Patent
Koide

(10) Patent No.: US 8,819,159 B2
(45) Date of Patent: Aug. 26, 2014

(54) DATA MANAGEMENT APPARATUS, CONTROL METHOD OF DATA MANAGEMENT APPARATUS, AND COMPUTER-READABLE STORAGE

(75) Inventor: Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 12/051,353

(22) Filed: Mar. 19, 2008

(65) Prior Publication Data

US 2008/0250096 A1    Oct. 9, 2008

(30) Foreign Application Priority Data

Apr. 9, 2007   (JP) ................................. 2007-102128

(51) Int. Cl.
*G06F 15/16*   (2006.01)
(52) U.S. Cl.
USPC ...... 709/208; 709/201; 709/209; 348/207.11; 348/211.1; 348/211.3; 348/211.4
(58) Field of Classification Search
CPC ............... H04N 5/23203; H04L 29/06; H04L 29/08072; H04L 12/403
USPC ............. 709/201, 223, 208, 209; 348/207.11, 348/211.1, 211.3, 211.4
See application file for complete search history.

(56) References Cited

U.S. PATENT DOCUMENTS

| | | | | |
|---|---|---|---|---|
| 6,469,891 B1 * | 10/2002 | Takita et al. | ................ | 361/679.4 |
| 6,675,224 B1 * | 1/2004 | Takita et al. | .................. | 709/244 |
| 6,864,918 B2 | 3/2005 | Koide | ........................ | 348/231.1 |
| 7,092,022 B1 * | 8/2006 | Brake | ....................... | 348/333.01 |
| 7,327,387 B2 * | 2/2008 | Tanaka et al. | ............ | 348/207.99 |
| 7,515,175 B2 * | 4/2009 | Tanaka et al. | ............ | 348/207.99 |
| 7,868,916 B2 * | 1/2011 | Kawashima | ............... | 348/207.2 |
| 8,396,979 B2 * | 3/2013 | Fujita | ............................. | 709/231 |
| 8,412,765 B2 * | 4/2013 | Wada et al. | .................... | 709/201 |
| 2001/0022624 A1 * | 9/2001 | Tanaka et al. | ............ | 348/333.02 |
| 2005/0122934 A1 * | 6/2005 | Fujita | ............................. | 370/328 |
| 2005/0128321 A1 | 6/2005 | Koide | ....................... | 348/231.99 |
| 2005/0198227 A1 * | 9/2005 | Nakama | ........................ | 709/220 |
| 2005/0223333 A1 * | 10/2005 | Yamamoto et al. | ........... | 715/765 |
| 2007/0253380 A1 * | 11/2007 | Jollota et al. | .................. | 370/338 |
| 2008/0088633 A1 * | 4/2008 | Lin et al. | ........................ | 345/520 |
| 2008/0109478 A1 * | 5/2008 | Wada et al. | ............... | 707/103 Y |

FOREIGN PATENT DOCUMENTS

| | | |
|---|---|---|
| JP | 2000-315183 A | 11/2000 |
| JP | 2005-175724 | 6/2005 |
| JP | 2006-80749 | 3/2006 |

* cited by examiner

*Primary Examiner* — Jimmy H Tran
(74) *Attorney, Agent, or Firm* — Fitzpatrick, Cella, Harper & Scinto

(57) ABSTRACT

A service providing unit adapted to provide a first service which transmits image data to the external apparatus under the control of the external apparatus on the network; a service retrieval unit adapted to retrieve the external apparatus, on the network, capable of providing a second service which processes the image data transmitted from the data management apparatus under the control of the data management apparatus; a service controlling unit adapted to control the external apparatus on the network such that the external apparatus provides the second service; and a switching unit adapted to switch between a first state that deactivates the service controlling unit and a second state that activates the service controlling unit based on a retrieval result by the service retrieving unit.

9 Claims, 12 Drawing Sheets

F I G. 2
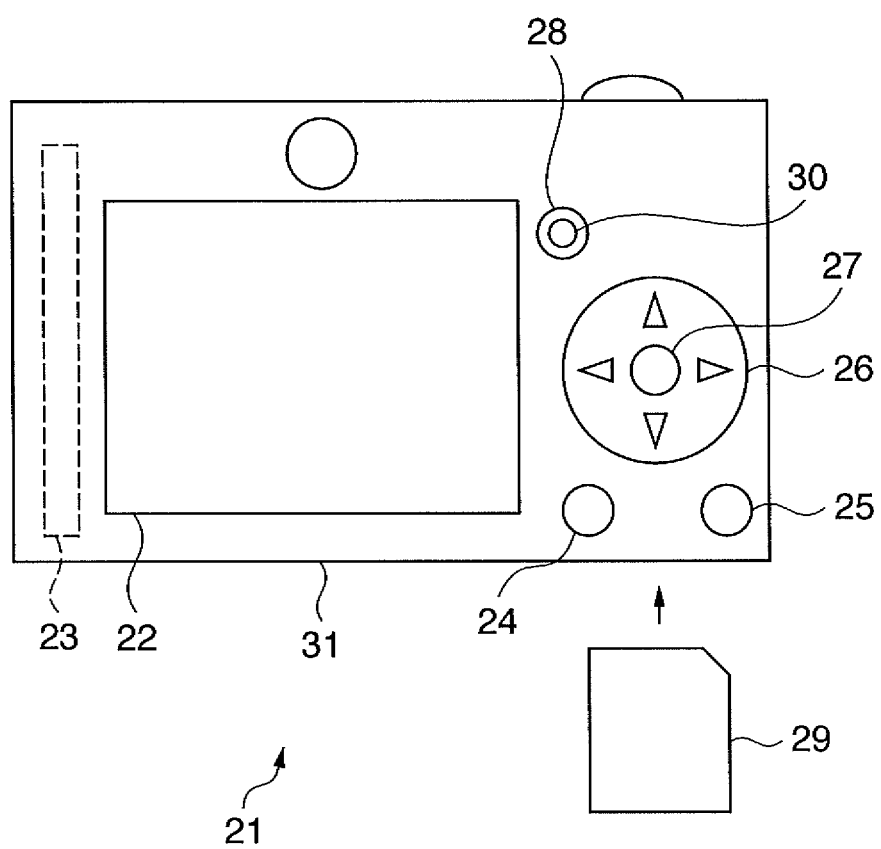

DATA MANAGEMENT APPARATUS, CONTROL METHOD OF DATA MANAGEMENT APPARATUS, AND COMPUTER-READABLE STORAGE

BACKGROUND OF THE INVENTION

1. Field of the Invention

The present invention relates to a data management apparatus, a control method of the data management apparatus, and a computer-readable storage.

2. Description of the Related Art

Image capturing devices such as digital cameras and the like are often connected to other apparatuses via a network. In a technique disclosed in Japanese Patent Laid-Open No. 2005-175724, a DVCR (digital video cassette recorder) is connected to an apparatus such as a television or the like via a wireless network. In this case, the DVCR serves as a UPnP Device, and a PC (personal computer) serves as a UPnP Control Point. Note that UPnP is an abbreviation for Universal Plug and Play.

In UPnP, two roles, i.e., the Control Point and Device, are defined for apparatuses connected to a network. The Device plays a role to provide some functions on the network. The Control Point plays a role to use the functions provided by the Device. The Device has a function of informing other apparatuses on the network of its functions and of participation to or disengagement from the network by multicasting data. The Control Point has a function of retrieving a Device providing a desired service on the network as a service, acquiring information from the Device, and controlling the Device.

Upon connecting to an external apparatus via a network, an image capturing device may desirably serve as the UPnP Control Point or as the UPnP Device in accordance with a request accepted from the user depending on cases.

The user may input an instruction to display image data captured by an image capturing device on a television screen by operating the television or television remote controller. At this time, it is desired that the image capturing device serves as the UPnP Device, and the television serves as the UPnP Control Point.

The user may operate the image capturing device to input an instruction to send image data captured by the image capturing device to the television, and to display it on the television screen. At this time, it is desired that the television serves as the UPnP Device, and the image capturing device serves as the UPnP Control Point.

However, with the technique described in Japanese Patent Laid-Open No. 2005-175724, an apparatus which serves as the UPnP Control Point and that which serves as the UPnP Device are fixed. As a result, the image capturing device cannot often meet the user's requirements when it is connected to external apparatus via the network, and the operability cannot be sufficiently improved.

Japanese Patent Laid-Open No. 2006-80749 describes an arrangement in which the user selects a communication partner at the beginning of a communication, and whether the image capturing device serves as the Control Point or Device is switched according to the selection result. In this case, since the image capturing device may have either of the two roles upon connecting to the television, a display dialog for prompting the user to select the communication partner has complicated contents, and the operability cannot be sufficiently improved.

SUMMARY OF THE INVENTION

The present invention provides for improving operability upon connecting to external apparatus via a network.

According to the first aspect of the present invention, there is provided a data management apparatus capable of communicating with an external apparatus via a network, comprising: a service providing unit adapted to provide a first service which transmits image data to the external apparatus under the control of the external apparatus on the network; a service retrieval unit adapted to retrieve the external apparatus, on the network, capable of providing a second service which processes the image data transmitted from the data management apparatus under the control of the data management apparatus; a service controlling unit adapted to control the external apparatus on the network such that the external apparatus provides the second service; and a switching unit adapted to switch between a first state that deactivates the service controlling unit and a second state that activates the service controlling unit based on a retrieval result by the service retrieving unit.

According to the second aspect of the present invention, there is provided a data management apparatus capable of communicating an external apparatus via a network, comprising: a service providing unit adapted to provide a first service to the external apparatus in response to a request from the external apparatus on the network; a service retrieval unit adapted to retrieve the external apparatus, on the network, capable of providing the second service; a service controlling unit adapted to control the external apparatus on the network such that the external apparatus provides the second service; and a switching unit adapted to switch between a first state that deactivates the service controlling unit and a second state that activates the service controlling unit based on a retrieval result of the service retrieving unit.

According to the third aspect of the present invention, there is provided a method of controlling a data management apparatus capable of communicating with an external apparatus via a network, comprising: providing a first service which transmits image data to the external apparatus under the control of the external apparatus on the network; retrieving the external apparatus, on the network, capable of providing a second service which processes the image data transmitted from the data management apparatus under the control of the data management apparatus; controlling the external apparatus on the network such that the external apparatus provides the second service; and switching between a first state that deactivates control of the external apparatus and a second state that activates control of the external apparatus based on the retrieval result.

According to the fourth aspect of the present invention, there is provided a method of controlling a data management apparatus capable of communicating with an external apparatus via a network, comprising: providing a first service to the external apparatus in response to a request from the external apparatus on the network; retrieving the external apparatus, on the network, capable of providing a second service; controlling the external apparatus on the network such that the external apparatus provides the second service; and switching between a first state that deactivates control of the external apparatus and a second state that activates control of the external apparatus based on the retrieval result.

According to the fifth aspect of the present invention, there is provided a computer-readable storage medium storing computer-readable instructions, the computer-readable instructions causing a computer to execute the method according to the third aspect of the present invention.

According to the sixth aspect of the present invention, there is provided a computer-readable storage medium storing computer-readable instructions, the computer-readable instructions causing a computer to execute the method according to the fourth aspect of the present invention.

According to the present invention, the operability upon connecting to external apparatus via a network can be improved.

Further features of the present invention will become apparent from the following description of exemplary embodiments with reference to the attached drawings.

BRIEF DESCRIPTION OF THE DRAWINGS

FIG. 2 is a view showing the outer appearance of a digital camera 21;

DESCRIPTION OF THE EMBODIMENTS

Figure 1:
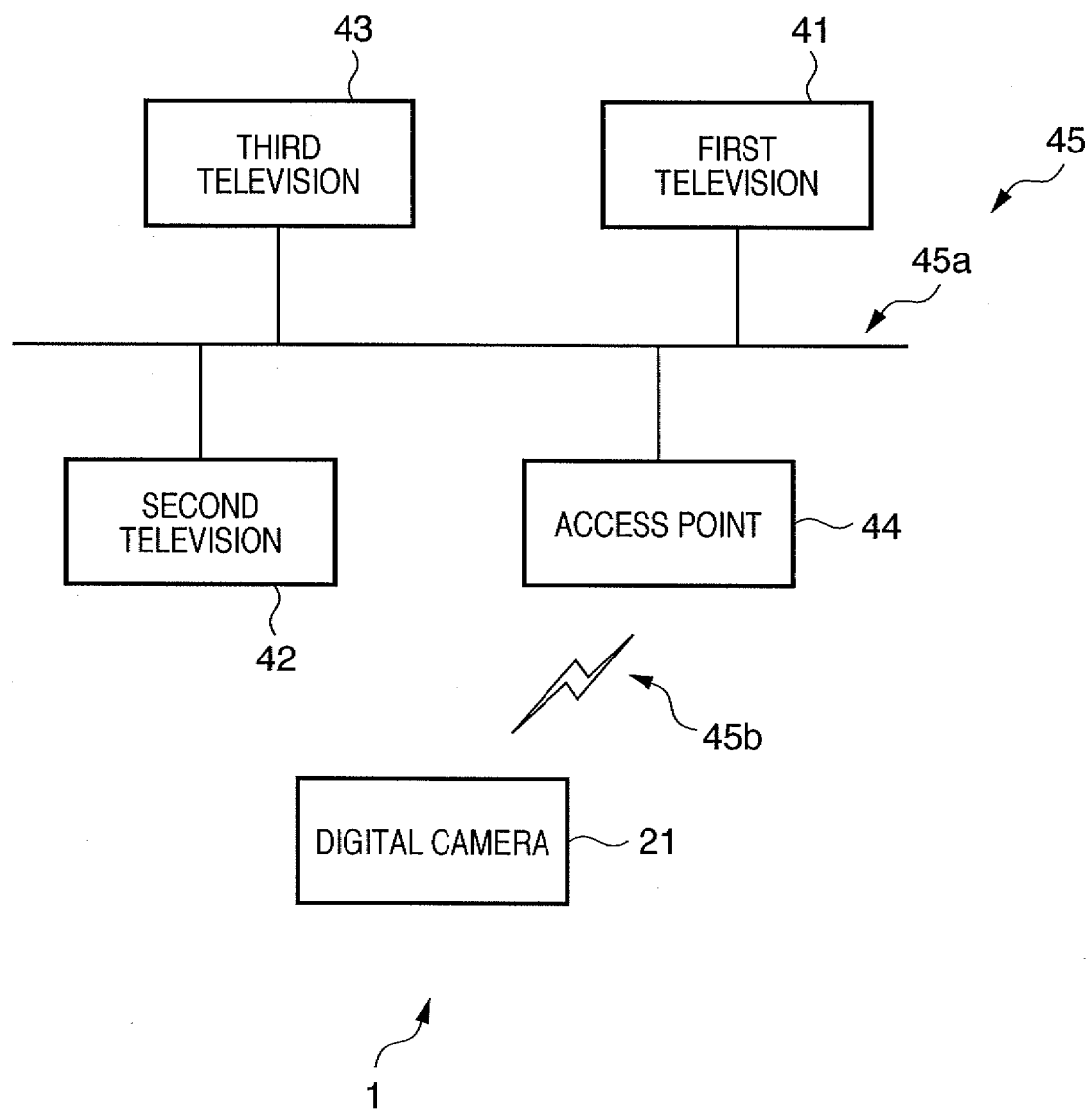
FIG. 1 is a diagram showing the arrangement of an image data management system 1 according to the first embodiment of the present invention.

An image data management system 1 according to the first embodiment of the present invention will be described below with reference to FIG. 1. FIG. 1 is a diagram showing the arrangement of the image data management system 1 according to the first embodiment of the present invention.

The image data management system 1 comprises a digital camera 21 as an example of a data management apparatus, a first television 41, a second television 42, a third television 43, an access point 44, and a network 45. The network 45 is a home network complying with the DLNA (Digital Living Network Alliance) specification. The network 45 comprises a wired LAN 45a and wireless LAN 45b.

The first, second, and third televisions 41, 42, and 43, and the access point 44 are connected via the wired LAN 45a. The digital camera 21 and access point 44 are connected via the wireless LAN 45b.

The digital camera 21 is connected to the access point 44 via the wireless LAN 45b. In this way, the digital camera 21 can participate in the network 45. The digital camera 21 serves as a UPnP (Universal Plug and Play) Device, and can provide image services to other apparatuses on the network 45. Or the digital camera 21 serves as a UPnP Control Point, and can control image services provided by other apparatuses. The image services include, for example, a service (image displaying service) for displaying images, and a service (image browsing service) for browsing images. These services will be described later.

The outer appearance of the digital camera 21 will be described below with reference to FIG. 2. FIG. 2 is a view showing the outer appearance of the digital camera 21.

The digital camera 21 comprises a housing 31, display unit 22, wireless communication I/F unit (wireless communication unit) 23, storage medium 29, DISP button 24, MENU button 25, arrow keys 26, SET button 27, wireless button 28, and LED 30.

The display unit 22 is arranged on a surface opposite to that on which a capturing lens is arranged of the housing 31. The display unit 22 comprises, e.g., an LCD monitor. The display unit 22 displays an object to be captured in real time. Hence, the display unit 22 allows the user to confirm the composition and exposure (electronic viewfinder function), and to confirm a captured image. The display unit 22 displays captured image data, various setting menus, and the like. As a result, the display unit 22 allows the user to browse image data, and to confirm various setting menus and the like.

The wireless communication I/F unit 23 is implemented inside the housing 31. The wireless communication I/F unit 23 is, for example, a communication interface complying with the IEEE802.11b standard.

The storage medium 29 is detachably connected to the housing 31. The storage medium 29 saves, for example, image data. The storage medium 29 is a removable medium such as a storage, memory card (SD (Japanese registered trademark) card, etc.), magneto-optical disk, or the like.

The DISP button 24 is arranged near the display unit 22 on the housing 31. The DISP button 24 is used to input an electronic viewfinder display instruction. Alternatively, the DISP button 24 is used to input an instruction to switch display/non-display of auxiliary information about capturing image and attribute information upon confirmation display of a captured image.

The MENU button 25 is arranged near the display unit 22 on the housing 31. The MENU button 25 is used to input various setting instructions.

The arrow keys 26 are arranged near the display unit 22 on the housing 31. The arrow keys 26 are used to input an instruction to sequentially switch images upon confirmation display of a captured image. Alternatively, the arrow keys 26 are used to input an instruction to switch menu items upon menu operations.

The SET button 27 is arranged near the display unit 22 and arrow keys 26 on the housing 31. The SET button 27 is used to input an instruction to determine a menu item upon menu operations.

The wireless button 28 is arranged near the display unit 22 on the housing 31. The wireless button 28 is used to input an instruction to start a wireless communication.

The LED 30 is arranged near the display unit 22 and wireless button 28 on the housing 31. The LED 30 can inform the user of a wireless communication state when it flickers or is lighted.

Figure 3:
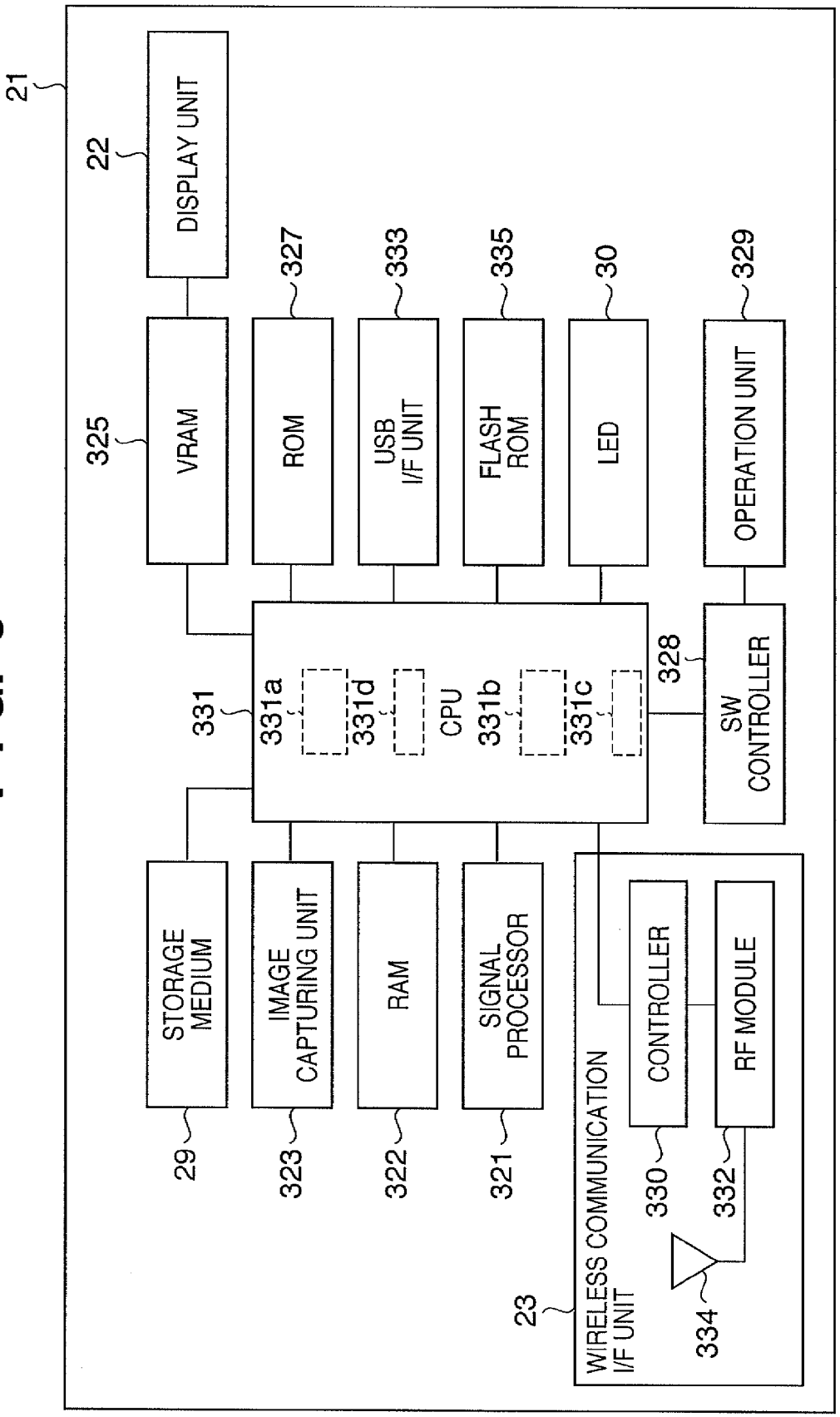
FIG. 3 is a block diagram showing the arrangement of the digital camera.

The arrangement and operation of the digital camera 21 will be described below with reference to FIG. 3. FIG. 3 is a block diagram showing the arrangement of the digital camera.

The digital camera 21 comprises an image capturing unit 323, a CPU 331, a signal processor 321, a RAM 322, a ROM 327, an operation unit 329, an SW controller 328, and the LED 30. The digital camera 21 comprises a VRAM 325, the wireless communication I/F unit 23, a USB I/F unit 333, and a FLASH ROM 335.

The image capturing unit 323 includes a capturing lens (not shown), an image capturing element, an analog/digital (A/D) converter, and the like. The image capturing element comprises, e.g., a CCD or CMOS sensor. The image capturing element receives light coming from an object which becomes incident via the capturing lens, and photoelectrically converts the received light to generate an analog image signal. The A/D converter is arranged after the CCD. The A/D converter receives the analog image signal from the CCD, and A/D-converts the analog image signal to generate a digital image signal. The image capturing unit 323 outputs the digital image signal.

The CPU 331 includes an image service providing unit 331a, image service controlling unit 331b, image service retrieval unit 331d, and switching unit 331c.

The image service providing unit 331a provides an image service to external apparatus (for example, the first television 41 shown in FIG. 1) via the wireless communication I/F unit 23. The image service in this embodiment is to provide the function of performing image processing such as image retrieval and display.

The image service retrieval unit 331d retrieves an image service provided by an external apparatus (for example, the first television 41 shown in FIG. 1). For example, the image service retrieval unit 331d detects existence of an image service provided by an external apparatus based on device specific information of that apparatus received by the wireless communication I/F unit 23.

The image service controlling unit 331b controls the image service provided by the other apparatus.

The switching unit 331c switches a first operation mode and a second operation mode based on the retrieval result of the image service retrieval unit 331d. The first operation mode activates the image service providing unit 331a, and deactivates the image service controlling unit 331b. The second operation mode activates the image service providing unit 331a and image service controlling unit 331b.

That is, in the first operation mode, the image service providing unit 331a provides an image service. That is, an external apparatus controls to use the function of the digital camera 21. In this mode, since the image service controlling unit 331b is not active, neither the other apparatus is controlled nor the function of the other apparatus is used. In the second operation mode, the image service controlling unit 331b controls the image service by the other apparatus, and the image service providing unit 331a provides the image service.

When the image service retrieval unit 331d is activated and it then detects existence of an image service provided by an external apparatus, the switching unit 331c sets the digital camera 21 in the second operation mode. When the image service retrieval unit 331d does not detect existence of an image service provided by an external apparatus, the switching unit 331c sets the digital camera 21 in the first operation mode.

Furthermore, the switching unit 331c activates the image service controlling unit 331b upon detection of generation of a user's operation in the second operation mode, and switches the operation mode from the second operation mode to a third operation mode that deactivates the image service providing unit 331a. In the third operation mode, the image service controlling unit 331b controls an image service by external apparatus.

Furthermore, when the image service retrieval unit 331d does not detect existence of the image service provided by an external apparatus, the switching unit 331c switches the operation mode from the second operation mode to the first operation mode.

When the camera serves as a UPnP Device, the image service providing unit 331a needs to be active. On the other hand, when the camera serves as a UPnP Control Point, the image service retrieval unit 331d and image service controlling unit 331b need to be active.

To the CPU 331, the image capturing unit 323, signal processor 321, RAM 322, ROM 327, SW controller 328, LED 30, VRAM 325, wireless communication I/F unit 23, USB I/F unit 333, and FLASH ROM 335 are connected. The CPU 331 supplies control commands to the image capturing unit 323 and the like to control the operation of the digital camera 21 as a whole.

For example, the CPU 331 controls the image capturing unit 323 to capture an object image, receives a digital image signal from the image capturing unit 323, and passes the digital image signal to the signal processor 321. The CPU 331 controls the signal processor 321 to apply predetermined signal processing to the digital image signal. The CPU 331 receives the processed digital image signal from the signal processor 321, and temporarily stores it in the RAM 322. The CPU 331 generates an image file by appending attribute information such as capturing setting information and the like to a header field of the digital image signal stored in the RAM 322, and saves the image file in the storage medium 29 and FLASH ROM 335.

The SW controller 328 controls inputs from the operation unit 329. For example, the SW controller 328 converts an input signal from the operation unit 329 into predetermined data, and passes the predetermined data to the CPU 331.

The operation unit 329 includes the DISP button 24, MENU button 25, arrow keys 26, SET button 27, wireless button 28 (see FIG. 2), and the like. The operation unit 329 accepts predetermined instructions from the user.

The VRAM 325 holds display data of a digital image signal, and display data of various user interfaces.

The display unit 22 is connected to the VRAM 325. The display unit 22 displays display data held by the VRAM 325.

The ROM 327 stores a program required to capture an image, a program required to display a captured image on the display unit 22, a program required to make a communication, and the like. The program required to make a communication interprets data received by the wireless communication I/F unit 23, and generates transmission data to be transmitted by the wireless communication I/F unit 23.

The wireless communication I/F unit 23 includes a controller 330, RF module 332, and antenna 334. The controller 330 controls the operation of the wireless communication I/F unit 23 based on control commands received from the CPU 331.

The operation of the digital camera 21 as the UPnP Device will be described below with reference to FIG. 1. A case will be exemplified wherein an external apparatus on the network which serves as the UPnP Control Point is the first television 41.

The digital camera 21 receives a discovery request from the first television 41 via the network 45 (via the network). The discovery request is a request used to find out a new apparatus connected to the network 45. Note that the digital camera 21 serves as the UPnP Device. The first television 41 serves as the UPnP Control Point.

The digital camera 21 returns device specific information described in an XML (Extensible Markup Language) format to the first television 41 via the network 45 (via the network) in response to the discovery request.

The first television 41 receives the device specific information from the digital camera via the network 45 (via the network) and via a communication unit (not shown). The first television 41 detects existence of the digital camera 21 on the network 45 based on the received device specific information.

The first television 41 detects based on the received device specific information that the digital camera 21 can provide an image browsing service. As a result, the first television 41 can accept an image file browsing instruction from the user. An image service controlling unit (not shown) of the first television 41 transmits an image file browsing instruction to the digital camera 21 via the communication unit and via the network 45 (via the network).

The wireless communication I/F unit 23 (see FIG. 3) of the digital camera 21 receives the image file browsing instruction from the first television 41 via the network 45. The wireless communication I/F unit 23 (see FIG. 3) passes the image file browsing instruction to the CPU 331 (see FIG. 3). The image service providing unit 331a (see FIG. 3) of the CPU 331 reads out image files from the storage medium 29 or FLASH ROM 335 (see FIG. 3) based on the image file browsing instruction, and passes them to the wireless communication I/F unit 23. The wireless communication I/F unit 23 transmits the image files to the first television 41 via the network 45. That is, the image service providing unit 331a of the CPU 331 provides the image browsing service to the first television 41 via the wireless communication I/F unit 23.

The first television 41 receives image files from the digital camera 21 via the network 45. In this way, the image service controlling unit of the first television 41 acquires the image files. That is, the image service controlling unit of the first television 41 acquires image data and information (attribute information) associated with the image data. A display unit (not shown) of the first television 41 can display image data captured by the digital camera 21 and its attribute information.

In this way, the user operates the first television 41 to control the digital camera 21 to transmit image files in the storage medium 29 of the digital camera 21 to the first television 41 via the network 45. The user can browse the image files by displaying them in turn on the display unit of the first television 41. That is, the digital camera 21 can provide the image browsing service, and the first television 41 can use that image browsing service.

Note that the functions provided by the image browsing service include a function of browsing image data and moving image data based on the image file browsing instruction, and a function of retrieving image files by designating attribute information. Also, the functions provided by the image browser service include a function of acquiring attribute information of image files and moving image files, a function of changing the attribute information of image files and moving image files, and the like.

The operation of the digital camera 21 as the UPnP Control Point will be described below with reference to FIG. 1. Note that a case will be exemplified wherein external apparatus on the network which serves as a UPnP Device is the first television 41.

The wireless communication I/F unit 23 (see FIG. 3) of the digital camera 21 transmits a discovery request to the first television 41 via the network 45. The discovery request is a request used to find out a new apparatus connected to the network 45. Note that the first television serves as the UPnP Device. The digital camera 21 serves as the UPnP Control Point.

The first television 41 receives the discovery request from the digital camera 21 via the communication unit (not shown) and via the network 45. The first television 41 returns device specific information described in an XML (Extensible Markup Language) format to the digital camera 21 via the network 45 in response to the discovery request.

The wireless communication I/F unit 23 (see FIG. 3) of the digital camera 21 receives the device specific information from the first television 41 via the network 45. The wireless communication I/F unit 23 (see FIG. 3) detects existence of the first television 41 on the network 45 based on the device specific information.

The CPU 331 detects based on the device specific information that the first television 41 can provide an image display service. Then, the operation unit 329 can accept an image file display instruction from the user. The image service controlling unit 331b (see FIG. 3) of the CPU 331 reads out image files from the storage medium 29 or FLASH ROM 335 (see FIG. 3) based on the image file display instruction, and passes them to the wireless communication I/F unit 23. The image service controlling unit 331b of the CPU 331 passes the image file display instruction to the wireless communication I/F unit 23. The wireless communication I/F unit 23 transmits the image file display instruction and the image files to the first television 41 via the network 45. That is, the image service controlling unit 331b of the CPU 331 controls the image display service provided by the first television 41 via the wireless communication I/F unit 23.

The first television 41 receives the image file display instruction and the image files from the digital camera 21 via the network 45. In this way, an image service providing unit of the first television 41 acquires the image file display instruction and the image files. That is, the image service providing unit of the first television 41 acquires image data, information (attribute information) associated with the image data, and the image file display instruction. As a result, the display unit (not shown) of the first television 41 can display the image data captured by the digital camera 21 and its attribute information.

In this way, the user operates the digital camera 21 to issue an instruction to display images. More specifically, the user operates the operation unit 329 such as the arrow keys 26, SET button 27, and the like of the digital camera 21 to select image files in the storage unit 29 while observing the display unit 22 of the digital camera 21, and to instruct to transmit them. Then, the user controls the digital camera 21 to transmit the image files to the first television 41, and browses image files by displaying them in turn on the display unit of the first television 41. That is, the first television 41 can provide the image display service, and the digital camera 21 can use the image display service.

As described above, when the digital camera 21 and the first to third televisions 41 to 43 comprise the image service controlling units, they can serve as UPnP Control Points. When the digital camera 21 and first to third televisions 41 to 43 comprise the image service providing units, they can serve as UPnP Devices.

The digital camera 21 of this embodiment can change its operation in accordance with a service provided by an apparatus on the network 45.

In general, in UPnP, when a UPnP Device is connected to the network, that UPnP Device multicasts an ALIVE message onto the network. The UPnP Device periodically multicasts the ALIVE message onto the network, thereby notifying a UPnP Control Point of existence of the UPnP Device. On the other hand, when a UPnP device disengages from the network, it multicasts a BYEBYE message, which is detected by a UPnP Control Point, thus notifying the UPnP Control Point of its disengagement.

Figure 4:
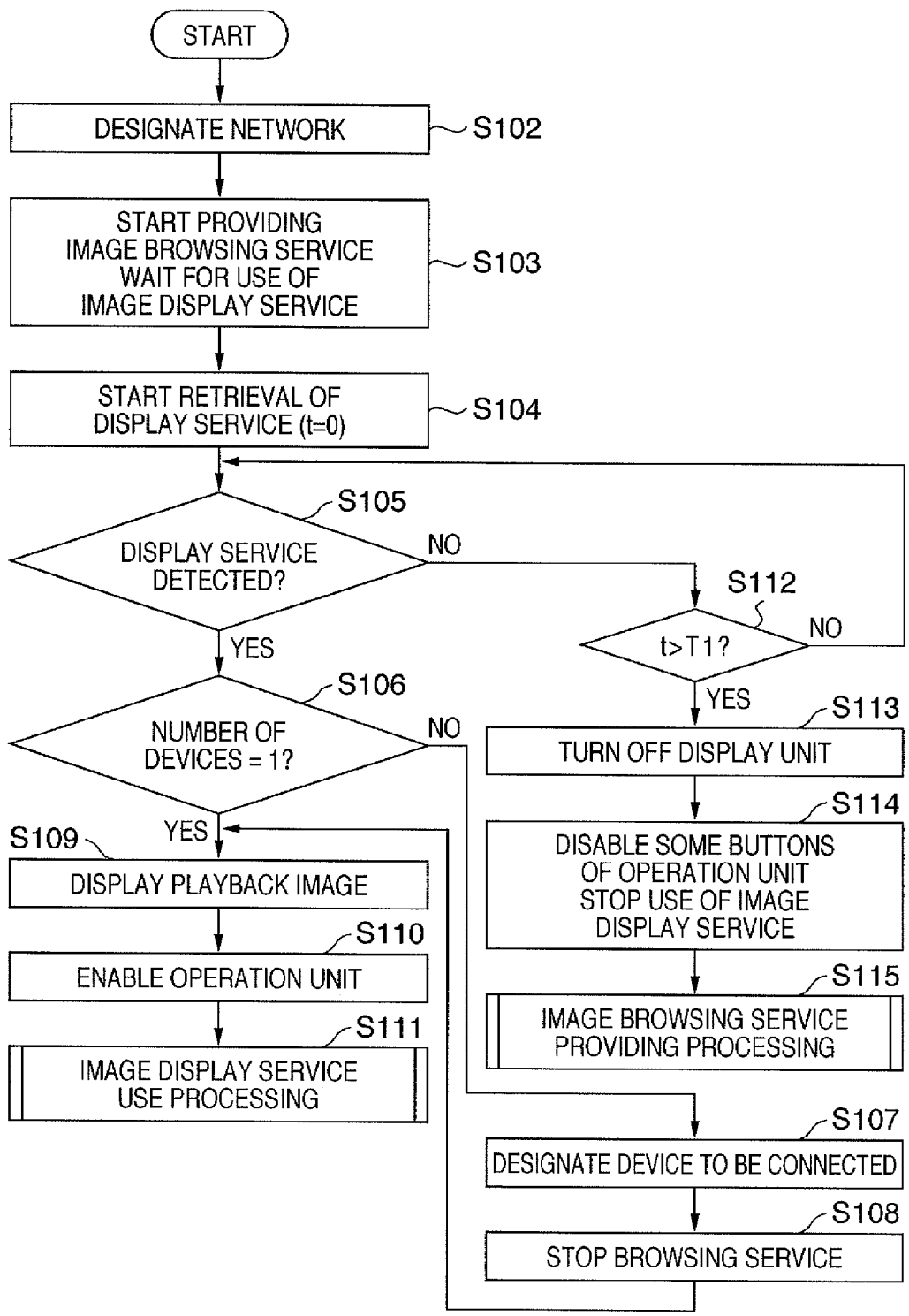
FIG. 4 is a flowchart showing the sequence executed when the digital camera is connected to a television on a network.

The sequence executed when the digital camera 21 of this embodiment is connected to the first to third televisions 41 to 43 via the network 45 will be described below with reference to the flowchart in FIG. 4.

Figure 9:
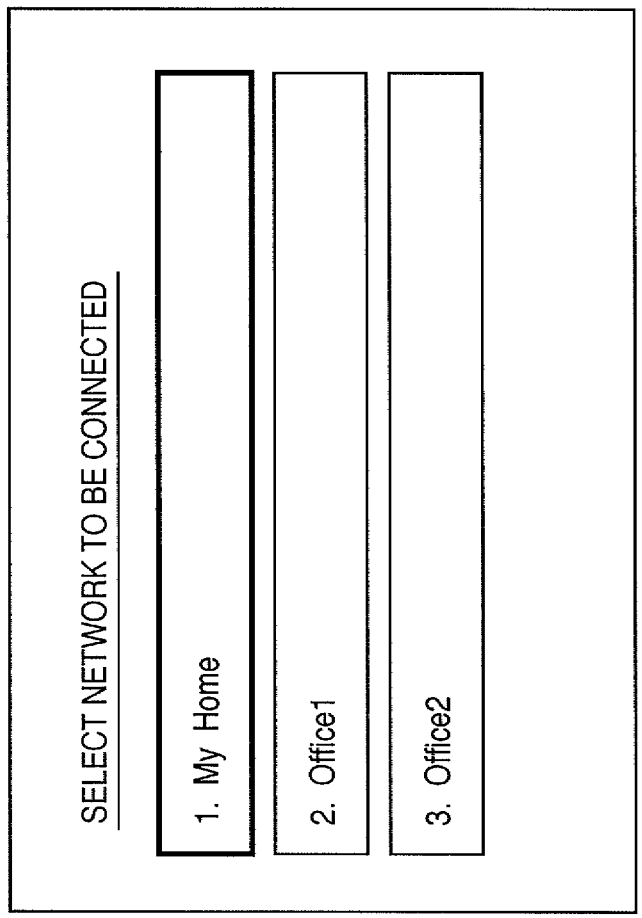
FIG. 9 shows a connecting destination designation window displayed on the display unit.

In step S102, the operation unit 329 accepts an instruction to select a network to be connected via a window shown in FIG. 9. Based on this instruction, the CPU 331 enables the wireless communication I/F unit 23.

In step S103, the image service providing unit 331a of the CPU 331 is activated to start an image browsing service. That is, the image service providing unit 331a starts processing according to a module for providing the image browsing service. The image service controlling unit 331b of the CPU 331 is activated to wait for use of the image display service. That is, the image service controlling unit 331b starts processing according to a module for providing the image display service.

In step S104, the image service retrieval unit 331d of the CPU 331 starts retrieval as to whether or not the image display service exists on the network 45 via the wireless communication I/F unit 23. At this time, the image service retrieval unit 331d records the retrieval start time.

The switching unit 331c of the CPU 331 checks in steps S105 and S112 if the image display service is detected. If the switching unit 331c determines that the image display service is detected, it sets the mode in the second operation mode, and the process advances to step S106. A case will be described below wherein no image display service is detected in step S105. The image service retrieval unit 331d of the CPU 331 retrieves an image display service for a predetermined period of time in step S112. This is to inform the user that a television comprising an image display service is available later. If the switching unit 331c determines that no image display service is detected for the predetermined period of time (T1), it sets the mode in the first operation mode, and the process advances to step S113.

If the digital camera 21 is set in the first operation mode, it deactivates the image service controlling unit 331b. If the digital camera 21 is set in the second operation mode, it continuously activates the image service providing unit 331a and image service controlling unit 331b.

The CPU 331 checks in step S106 how many UPnP Devices which provide an image display service exist on the network 45. If the CPU 331 determines that only one UPnP Device which provides an image display service exists, the process advances to step S109; if it determines that a plurality of UPnP Devices which provide an image display service exist, the process advances to step S107.

Figure 8:
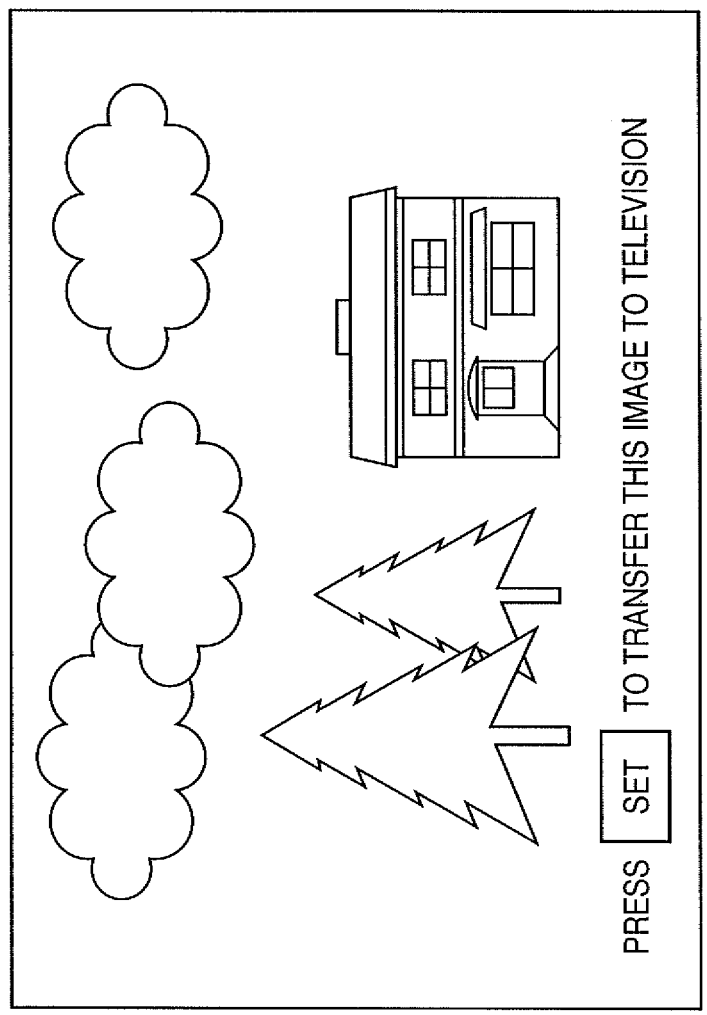
FIG. 8 shows an image displayed on a display unit.

In step S109, the CPU 331 displays a window shown in FIG. 8 on the display unit 22 of the digital camera to indicate that the user can use the image display service by operating the digital camera 21.

In step S110, the CPU 331 enables the buttons and keys of the operation unit 329 of the digital camera 21, which are used in the image display service.

Figure 5:
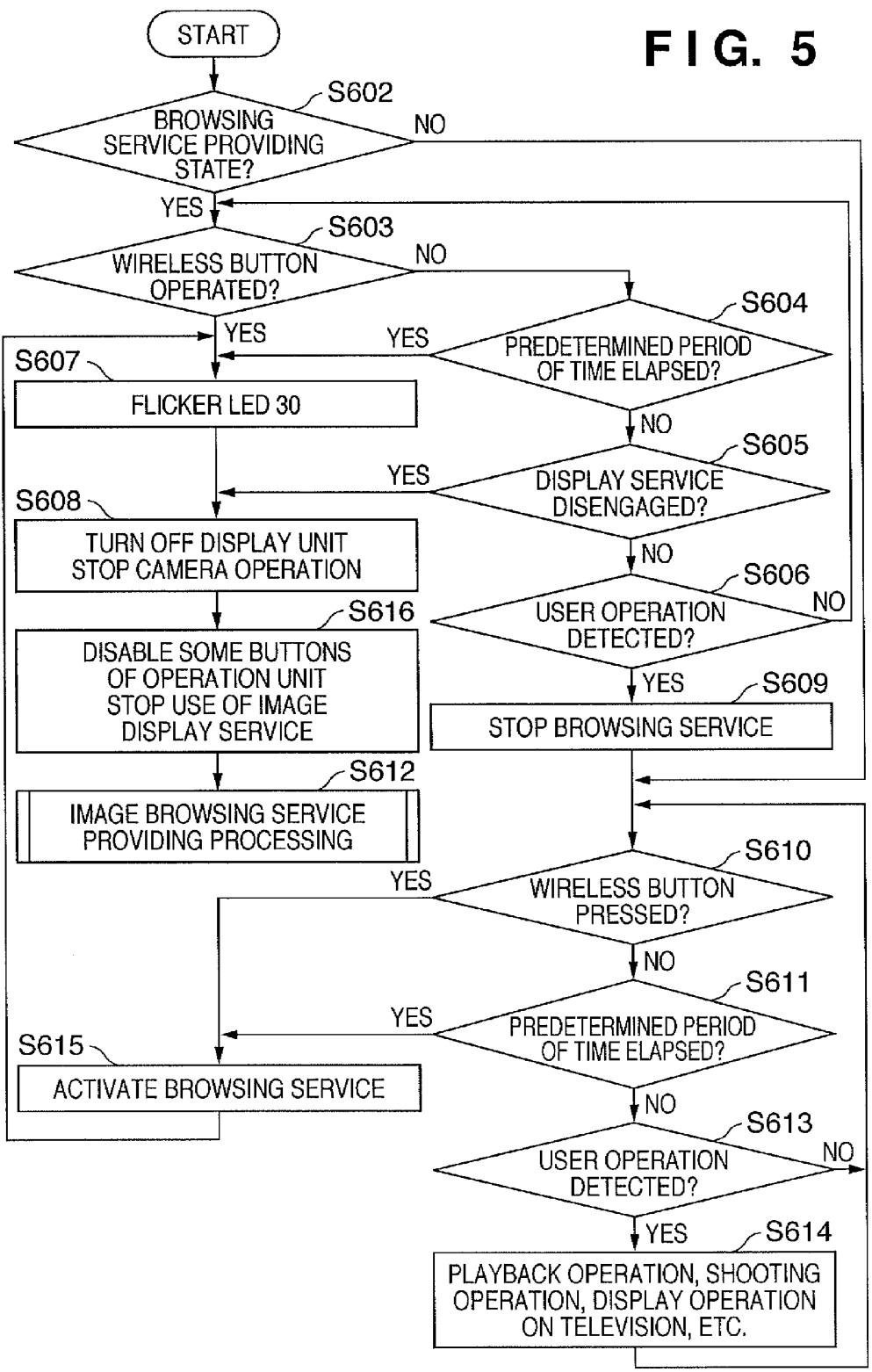
FIG. 5 is a flowchart showing the sequence of image display service use processing.

In step S111, the digital camera 21 executes image display service use processing (see FIG. 5).

Figure 10:
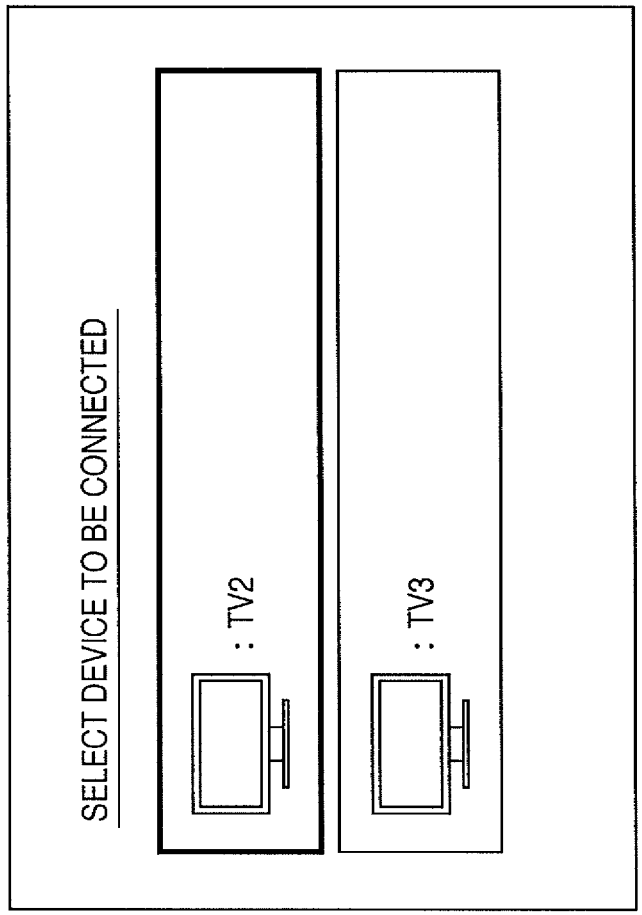
FIG. 10 shows an image display service designation window displayed on the display unit.

In step S107, the CPU 311 accepts an instruction to select an image display service to be connected via an image display service designation window shown in FIG. 10 in response to the user's operation of the operation unit 329.

In step S108, the switching unit 331c deactivates the image service providing unit 331a to stop the image browsing service, thus switching the operation mode from the second operation mode to the third operation mode. This processing can control the digital camera 21 and the televisions (first to third televisions 41 to 43) not to execute operations against the user's intention.

A case will be described wherein no image display service is detected in steps S105 and S112. As described above, if the switching unit 331c determines in steps S105 and S112 that no image display service is detected for the predetermined period of time (T1), it sets the mode in the first operation mode, and the process advances to step S113.

In step S113, the CPU 331 turns off the display unit 22.

In step S114, the CPU 331 disables the operations of the operation unit 329 of the digital camera except for the main switch and wireless button 28 via the SW controller 328. At the same time, the switching unit 331c deactivates the image service controlling unit 331b. In this manner, the image display service is not available.

Figure 6:
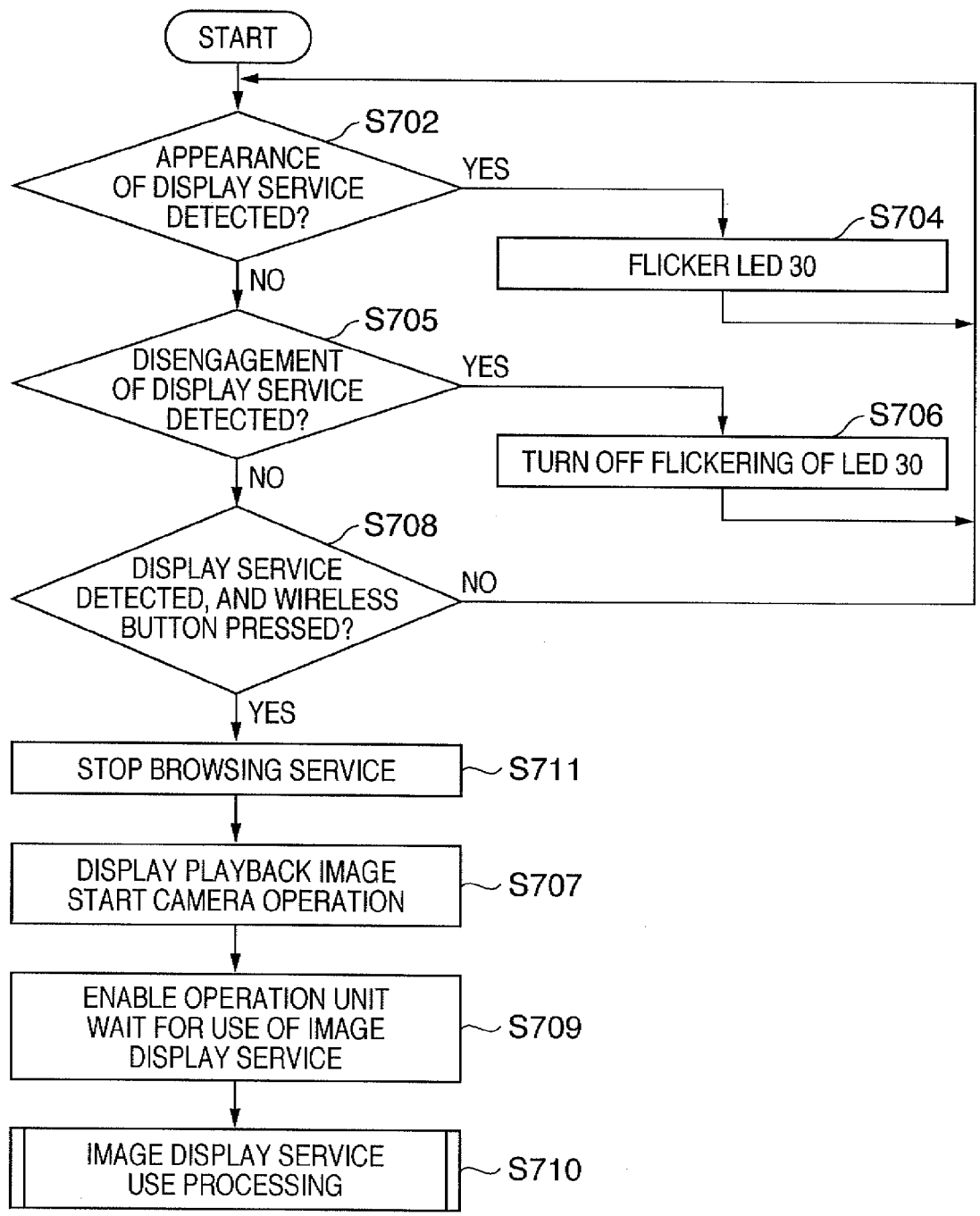
FIG. 6 is a flowchart showing the sequence of image browsing service providing processing.

In step S115, the digital camera 21 executes image browsing service providing processing (see FIG. 6).

The sequence of the image display service use processing will be described below with reference to the flowchart of FIG. 5. Note that the digital camera 21 serves as a UPnP Control Point when it controls the first to third televisions 41 to 43 and uses the image display service. At this time, when the digital camera 21 is in an image browsing service providing state, it serves as a UPnP Device at the same time.

The CPU 331 checks in step S602 if the digital camera is in an image browsing service providing state. If the CPU 331 determines that the digital camera is in an image browsing service providing state; the process advances to step S603; otherwise, the process jumps to step S610.

The CPU 331 checks in step S603 if the user has pressed the wireless button 28. If the CPU 331 determines that the user has pressed the wireless button 28, the process advances to step S607; otherwise, the process advances to step S604.

The CPU 331 checks in step S604 if a predetermined period of time has elapsed since the user's last operation of the digital camera 21. If the CPU 331 determines that the predetermined period of time has elapsed, the process advances to step S607; otherwise, the process advances to step S605.

In step S607, the CPU 331 flickers the LED 30.

In step S608, the CPU 331 turns off the display unit 22, and stops a playback mode and shooting mode at the same time.

In step S616, the CPU 331 disables the operations of the operation unit 329 except for the main switch and wireless button 28 via the SW controller 328. At the same time, the switching unit 331c deactivates the image service controlling unit 331b to set a state in which the image display service is not available, thereby switching the operation mode from the second operation mode to the first operation mode.

In step S612, the digital camera 21 executes the image browsing service providing processing. The image browsing service providing processing is executed according to the flowchart shown in FIG. 6.

A case will be described below wherein it is determined in step S604 that the predetermined period of time has not elapsed yet.

The image service retrieval unit 331d of the CPU 331 checks in step S605 if an image display service disengages from the network. If the image service retrieval unit 331d determines that the image display service disengages from the network, the process advances to step S608; otherwise, the process advances to step S606.

In step S608, the CPU 331 turns off the display unit 22.

The CPU 331 checks in step S606 if the user has operated the button or key of the operation unit 329 other than the wireless button 28. If the CPU 331 determines that the user has operated the operation unit 329, the process advances to step S609; otherwise, the process returns to step S603.

In step S609, the switching unit 331c deactivates the image service providing unit 331a to stop providing the image browsing service, thus switching the operation mode from the second operation mode to the third operation mode.

The CPU 331 checks in step S610 if the user has pressed the wireless button 28. If the CPU 331 determines that the user has pressed the wireless button 28, the process advances to step S615; otherwise, the process advances to step S611.

The CPU 331 checks in step S611 if a predetermined period of time has elapsed since the user's last operation of the digital camera 21. If the CPU 331 determines that the predetermined period of time has elapsed, the process advances to step S615; otherwise, the process advances to step S613.

In step S615, the switching unit 331c activates the image service providing unit 331a to start providing the image browsing service, and the process returns to step S607 to switch the operation mode from the third operation mode to the first operation mode.

The CPU 331 checks in step S613 if the user has operated the arrow keys 26, SET button 27, or the like of the operation unit 329. If the CPU 331 determines that the user has operated the operation unit 329, the process advances to step S614; otherwise, the process returns to step S610.

In step S614, the CPU 331 executes the camera operation corresponding to the operation contents, and the displayback operation of image data on the television. That is, if the user presses one of the arrow keys 26, the CPU 331 can switch image data to be displayed on the display unit 22 of the digital camera 21 or can display the displayed image data in an enlarged scale. If the user has pressed the SET button 27 while the display unit 22 displays image data, he or she can issue an instruction to transmit the image data displayed on the display unit 22 to the television (one of the first to third televisions 41 to 43) and to display it on the display unit of that television. If the user instructs to shift to the shooting mode, the display unit 22 of the digital camera 21 displays an EVF (electronic viewfinder) image. If the user has pressed a release button (not shown), an object image is captured, and image data of the object is recorded in the storage medium 29. Furthermore, the user instructs to transmit the captured image data to the television (one of the first to third televisions 41 to 43) and to display it on the display unit of the television.

The processing executed when the digital camera 21 uses the image display service has been described. The sequence of the processing executed when the digital camera provides the image browsing service and does not use any image display service in the first operation mode will be described below with reference to the flowchart of FIG. 6. Note that the digital camera 21 activates the image service providing unit 331a and serves as a UPnP Device upon execution of the image browsing service providing processing. In the first operation mode, the image service controlling unit 331b is inactive. On the other hand, the image service retrieval unit 331d is active.

The image service retrieval unit 331d of the CPU 331 retrieves an image display service and checks in step S702 if an image display service becomes available. If the image service retrieval unit 331d determines that an image display service becomes available, the process advances to step S704; otherwise, the process advances to step S705.

In step S704, the CPU 331 flickers the LED 30 of the wireless button 28 in a predetermined cycle, thus notifying the user that the image display service is available if he or she presses the wireless button 28. In this case, this notification is made while the display unit 22 of the digital camera 21 is kept OFF. Therefore, the digital camera 21 can save its consumption power, and can inform the user that the image display service is available.

The image service retrieval unit 331d of the CPU 331 checks in step S705 if the image display service disengages. If the image service retrieval unit 331d determines that the image display service disengages, the process advances to step S706; otherwise, the process advances to step S708.

In step S706, the CPU 331 stops flickering the LED 30 to notify the user that the image display service is not available.

The CPU 331 checks in step S708 if the image display service is available, and the user has pressed the wireless button 28. If the CPU 331 determines that the image display service is available, and the user has pressed the wireless button 28, the process advances to step S711. On the other hand, if the CPU 331 determines that the image display service is not available, and the user has not pressed the wireless button 28, the process returns to step S702.

In step S711, the switching unit 331c of the CPU 331 deactivates the image service providing unit 331a to stop the image browsing service.

In step S707, the CPU 331 turns on the display unit 22 to use the image display service, so as to display a playback image, and to restart the camera operation.

In step S709, the CPU 331 enables the operations of the operation unit via the SW controller 328. The switching unit 331c activates the image service controlling unit 331b to switch the mode to the third operation mode. In this way, the digital camera waits for use of the image display service.

In step S710, the digital camera 21 executes the image display service use processing. The image display service use processing is executed according to the flowchart shown in FIG. 5.

The processing sequence executed when the digital camera 21 provides the image browsing service has been described. As described above, the digital camera 21 executes the processing according to the flowcharts shown in FIGS. 5 and 6 in response to a change in configuration of the network, a user's operation, and the like.

Figure 7:
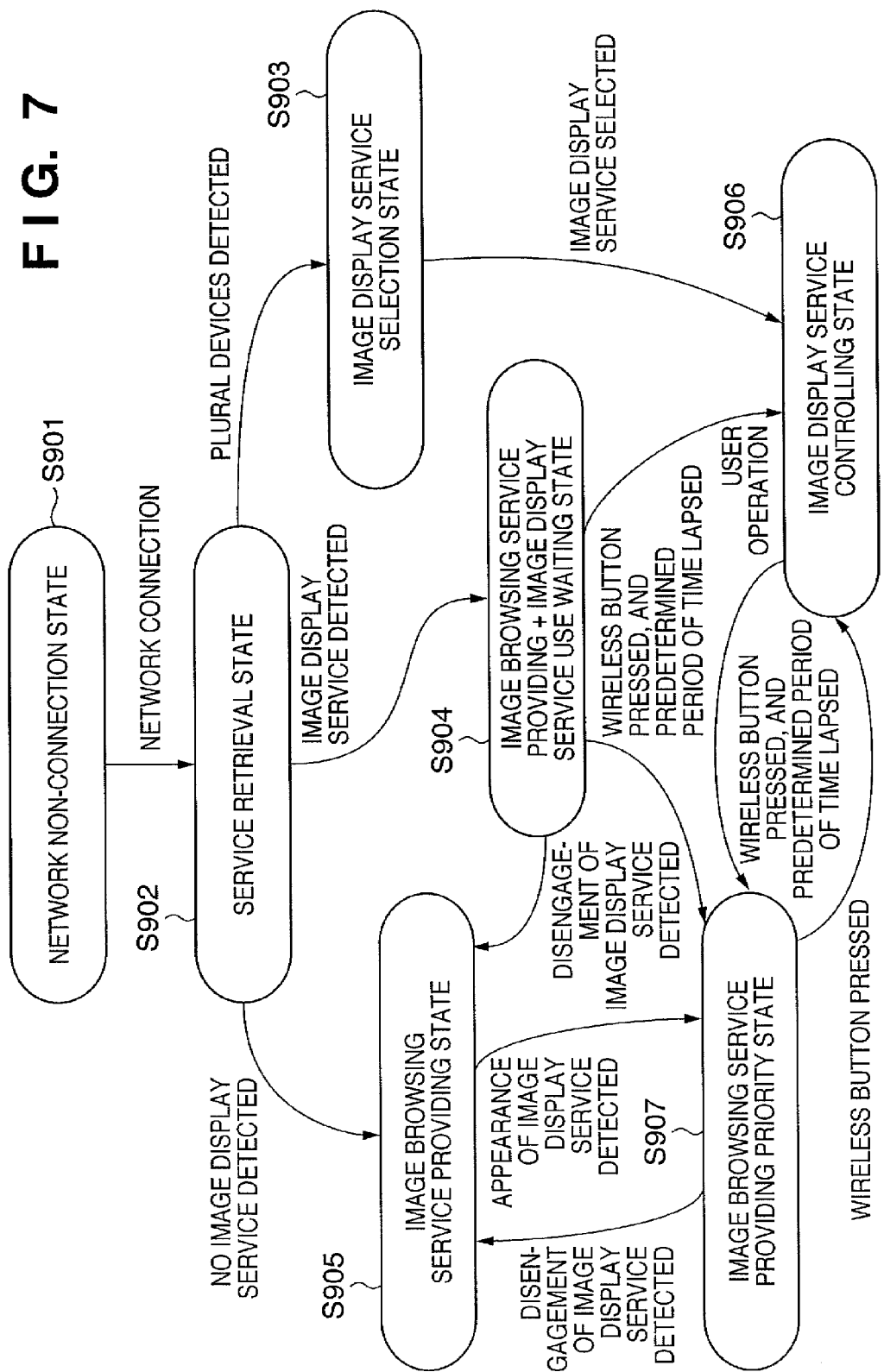
FIG. 7 is a state transition diagram showing the operation of the digital camera.

State transition when the digital camera 21 of this embodiment is connected to the first to third televisions 41 to 43 via the network 45 will be described below with reference to FIG. 7. FIG. 7 is a state transition diagram showing the operation of the digital camera 21. Note that the second television 42 will be mainly explained hereinafter as an apparatus other than the digital camera 21 connected to the network 45, but the same applies to other apparatuses.

In state S901, the digital camera 21 is not connected to the network 45. In this state, the digital camera 21 alone allows the user to capture object images and to browse captured image data on the display unit 22. If the user presses the wireless button 28 (see FIG. 2) in this state, a connection destination designation window shown in FIG. 9 is displayed on the display unit 22. The user inputs an instruction to select a network to be connected (e.g., the network 45) to the operation unit 329 (see FIG. 3) using this connection destination designation window. The CPU 331 (see FIG. 3) receives the instruction from the operation unit 329, and activates the wireless communication I/F unit 23 in response to that instruction, thus setting a state connectable to the designated network 45. In this state, it is not yet determined whether the digital camera 21 serves as a UPnP Device or UPnP Control Point.

When the digital camera 21 is connected to the designated network 45, it transits to service retrieval state S902. In this state, the digital camera 21 provides an image browsing service, and simultaneously checks if a UPnP Device having an image display service exists on the network 45. This corresponds to the process in step S104 in FIG. 4. The image display service retrieval operation in state S902 continues for a predetermined period of time if no UPnP Device having an image display service is detected. This is to inform the user that a television having an image display service becomes available later if the user wants to connect the digital camera 21 to a television having an image display service (for example, the second and third televisions 42 and 43).

If the digital camera 21 detects a plurality of apparatuses having an image display service in state S902, it sets the second operation mode, and transits to state S903. This is the case when the image display service is detected in step S105 in FIG. 4, and it is determined in step S106 that a plurality of devices are detected. If only one apparatus having an image display service is detected, the digital camera 21 sets the second operation mode, and transits to state S904. This is the case when the image display service is detected in step S105 in FIG. 4, and it is determined in step S106 that the number of devices is one. In states S903 and S904, the digital camera 21 serves as the UPnP Device and also as the UPnP Control Point.

In state S903, the user can select which image display service he or she uses. This corresponds to the process in step S107 in FIG. 4. FIG. 10 shows an example of an image display service designation window when the digital camera 21 is connected to the network 45. The display unit 22 displays the image display service designation window to allow the user to select one of the image display services of the plurality of apparatuses which are connected to the network 45 and comprises image service providing units. FIG. 10 shows an example, when the second and third televisions 42 and 43 comprise the image service providing units.

State S904 corresponds to an image browsing service providing+image display service use waiting state. In this state, the digital camera provides the image browsing service, and allows the user to use the image display service of the second television 42. This is the case when the process in step S111 is executed without executing the browsing service stop processing in step S108 in FIG. 4. As shown in FIG. 8, the digital camera 21 displays image data on the display unit 22.

In state S904 and state S906 (to be described later), assume that the user can browse image data on the display unit 22, can change various settings by displaying a menu window, or can capture an object image using the operation unit 329.

When the user operates the digital camera 21 to select the image display service of the second television 42 in state S903, the digital camera 21 is switched from the second operation mode to the third operation, and transits to image display service control state S906. This corresponds to step S108 in FIG. 4. Such transition is made since it is determined that the user intends to view images by operating the digital camera 21.

When a user's operation is also accepted from the operation unit 329 other than the wireless button 28 of the digital camera 21 in state S904, the digital camera 21 is switched from the second operation mode to the third operation mode, and transits to state S906. This corresponds to the processes in steps S606 and S609 in FIG. 5. Such transition is also made since it is determined that the user intends to view images by operating the digital camera 21.

Upon transition to state S906, the digital camera 21 transmits a UPnP BYEBYE message onto the network to stop providing the image browsing service. That is, the digital camera 21 stops the operation as the UPnP Device. As a result, the digital camera 21 can be switched from the second operation mode to the third operation mode. The reason why the third operation mode is provided in addition to the second operation mode is as follows. That is, if the image browsing service is kept provided in state S906, the digital camera 21 receives accesses from a plurality of UPnP Devices that use the image browsing service. Since a portable apparatus like the digital camera 21 has the limited storage capacity of the RAM 322 and the limited processing performance of the CPU 311, it is difficult to accept all requests from a plurality of UPnP Control Points.

In state S906, as described above, the user can browse image data on the display unit 22 of the digital camera 21, can change various settings by displaying a menu window, and can capture object images. For this reason, the storage capacity of the RAM 322 required to execute these shooting operations and playback operations must be assured. Upon execution of the shooting operation and playback operation, since the use ratio of the CPU 331 becomes high, it is difficult to parallelly provide the image browsing service to a plurality of apparatuses. The operation for reading out image data from the storage medium 29 and allowing the user to browse image data on the display unit 22 of the digital camera 21 may overlap the operation for reading out image data from the storage medium 29 and transmitting them to an external apparatus in response to a request from that apparatus. At this time, accesses to the storage medium 29 occur at the same time, and the operability of the playback operation of the digital camera 21 may impair. For this reason, in state S906, the operation as the UPnP Device is stopped to stop providing the image browsing service.

Note that the user can make the same operation as the playback mode or shooting mode of the digital camera 21 in state S906.

For example, in the playback mode, the user can switch image data to be displayed on the display unit or can display the displayed image data in an enlarged scale by operating the arrow keys 26 of the digital camera 21. Furthermore, when the user presses the SET button 27 while image data is displayed, he or she can issue an instruction to transmit the displayed image data to the second television 42 and to display it on the display unit of the second television 42. In this playback mode, the RAM 322 of the digital camera 21 is mainly used as a temporary storage of buffer data for image playback and data for image display service control.

Alternatively, for example, in the shooting mode, the user instructs to capture an image by pressing the release button (not shown) while watching an EVF (electronic viewfinder) image displayed on the display unit 22 of the digital camera 21. In this manner, an object image is captured, and image data of the object is stored in the storage medium 29. Furthermore, the user instructs to transmit the captured image data to the second television 42 and to play it back on the display screen of the second television 42. When the camera is in the shooting mode in state S906, the RAM 322 of the digital camera is mainly used as a temporary storage of buffer data of captured image data and data for image display service control.

On the other hand, when the digital camera 21 does not detect any image display service in state S902, it sets the mode in the first operation mode, and transits to image browsing service providing state S905. This is the case when no image display service is detected in step S105 in FIG. 4. For example, the digital camera 21 transits to state S905 when all apparatuses which comprise the image service providing units (for example, the second and third televisions 42 and 43) are OFF.

In this case, the digital camera 21 activates the image service providing unit 331*a*, and serves as a UPnP Device.

In state S905, the digital camera 21 provides the image browsing service, and executes an image display service retrieval operation at predetermined time intervals so as to detect appearance of a new UPnP Device having an image display service on the network 45. In state S905, the user browses image files in the storage medium 29 of the digital camera 21 in turn on the display unit of the television by, e.g., operating a remote controller or the like of the first television 41. For this reason, only the main switch is enabled so as not to influence the operation if the user erroneously touches the operation unit 329 of the digital camera 21. Also, the display unit 22 of the digital camera 21 is kept OFF to save consumption power. This process corresponds to steps S113 and S114 in FIG. 4.

When connection of a UPnP Device having an image display service to the network 45 is detected in state S905, the digital camera 21 transits to image browsing service providing priority state S907. This is the case when connection of an image display service is detected in step S702 in FIG. 6.

Also, when it is determined in state S904 or S906 that the predetermined period of time has elapsed since the user's last operation of the digital camera 21, the digital camera 21 transits to image browsing service providing priority state S907. This is the case when it is determined in step S611 in FIG. 6 that the predetermined period of time has elapsed.

Alternatively, when it is determined in state S904 or S906 that the user has pressed the wireless key, the digital camera 21 transits to image browsing service providing priority state S907. This is the case when it is determined in step S610 in FIG. 6 that the user has pressed the wireless button.

In state S907, the digital camera 21 serves as a UPnP Device, and provides the image browsing service. At the same time, the digital camera 21 executes the image display service retrieval operation at predetermined time intervals so as to detect disengagement of the image display service from the network 45. In state S907, the user browses image files in the storage unit 29 of the digital camera 21 in turn on the display unit of the television by operating a remote controller or the like of the television (for example, the first to third television 41 to 43), as in state S905. For this reason, only the main switch is enabled so as not to influence the operation if the user erroneously touches the operation unit 329 of the digital camera 21. Also, the display unit 22 of the digital camera 21 is kept OFF to save consumption power.

Since a UPnP Device having an image display service exists on the network 45 in state S907, it is desirable for the user to use this Device by operating the digital camera 21. For this purpose, the LED 30 of the wireless button 28 is flickered in a predetermined cycle to notify the user that the image display service is available. This corresponds to step S704 in FIG. 6.

When it is determined in state S907 that the user has pressed the wireless button 28, the digital camera 21 switches the mode from the first operation mode to the third operation mode, and transits to image display service control state S906. This is the case when it is determined in step S708 in FIG. 6 that the user has pressed the wireless button. Upon transition to this state, the digital camera transmits a UPnP BYEBYE message onto the network to stop providing the image browsing service as in transition from state S904. This corresponds to step S711 in FIG. 6.

Upon detection of disengagement of the image display service from the network 45 in state S907, the digital camera 21 transits to state S905. This is the case when disengagement of the image display service is detected in step S705 in FIG. 6.

As described above, when no apparatus which can provide an image display service is available as a result of retrieval in state S902, the display unit 22 of the digital camera 21 is turned off. This operation can simply notify the user that it is impossible to use the service by operating the digital camera 21.

When the user has operated the operation unit 329 of the digital camera 21 in state S904, the digital camera transits to image display service control state S906. In this manner, the user can display an image on the television by operating the digital camera 21 or can use the image browsing service by operating a remote controller of the television. Whether the user uses the image display service of the television or the image browsing service of the digital camera 21 can be determined by detecting whether the user operates the digital camera 21 or the television. In this way, a simple operation and intuitive operability can be provided to the user.

Especially, when there are a plurality of UPnP Devices that use the image browsing service and there is one UPnP Device that provides the image display service on the network 45, the operability for the user can be improved. That is, after the user selects the network 45 to be connected using the digital camera 21, a network connection between the digital camera 21 and television can be established by operating the remote controller of the television to be operated or the digital camera 21. In this way, the user can continue the operation without changing from the digital camera 21 to the remote controller of the television. There is no limitation on the activation order such that the digital camera 21 fails to retrieve an image display service if the service of the television is activated first.

A case will be examined below wherein the first television 41 that uses the image browsing service and the second television 42 that provides the image display service exist on the network 45, and the user uses the image display service of the second television 42 by operating the digital camera 21. At this time, the first television 41 may detect participation (appearance) of the digital camera 21 to the network 45, and may automatically use the image browsing service of the digital camera 21. Even in this case, the digital camera 21 accepts an image file display instruction from the user, and can control and use the image display service of the second television 42 by establishing a connection to the target second television 42. Since the digital camera 21 stops providing the image browsing service as it uses the image display service, the digital camera 21 and television can be controlled not to execute operations against user's intention.

When the user operates the television, the digital camera 21 turns off the power supply of the display unit 22 in state S905 or S907 to disable operations except for specific buttons or keys of the operation unit 329. In this way, consumption power can be reduced, and troubles caused by accidental user's operations of the digital camera can be prevented.

Also, since the LED 30 of the wireless button 28 is flickered in a predetermined cycle in state S907, it can simply notify the user that the image display service is available.

Since providing the image browsing service is stopped in state S906, the storage capacity of the RAM 322 of the digital camera 21 can be efficiently used, and the operability and various processing performances of the digital camera 21 can be prevented from impairing.

Note that this embodiment has exemplified a case in which an image service is provided on a system including a digital camera and television. However, the present invention is not necessarily limited to this system. For example, the present invention is also applicable to a case in which a service about music data is provided on a system including a portable music player and audio set.

Figure 11:
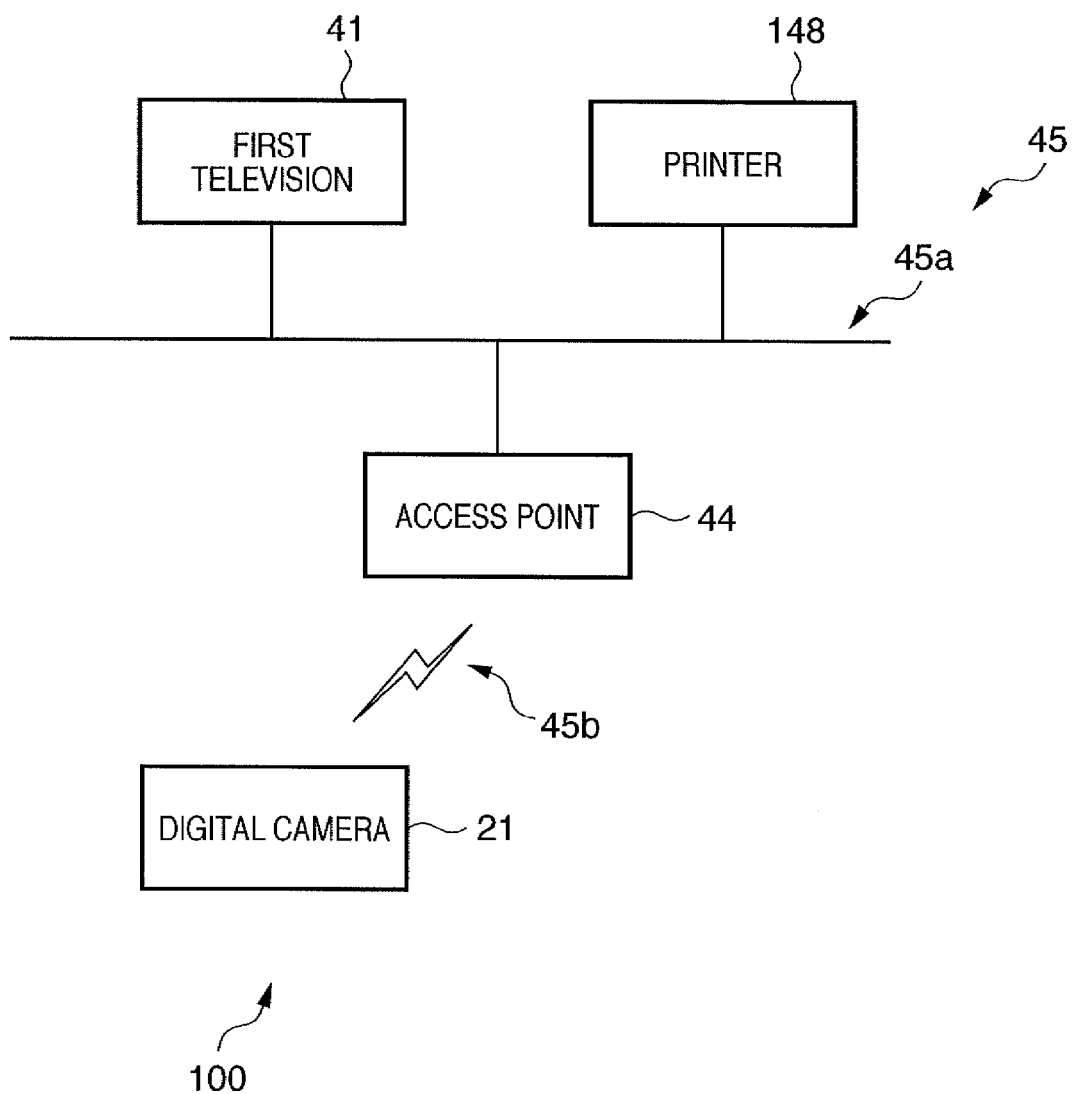
FIG. 11 is a diagram showing the arrangement of an image data management system 1 according to the second embodiment of the present invention.

An image data management system 100 according to the second embodiment of the present invention will now be described below with reference to FIG. 11. Differences from the first embodiment will be described below, and a description of the same parts will not be repeated.

The basic arrangement of the image data management system 100 is the same as that of the first embodiment, except that the system 100 comprises a printer 148 unlike in the first embodiment.

The printer 148 comprises an image print service providing unit. A digital camera 21 has an image print service controlling unit as another image service controlling unit 331b in the first embodiment. The digital camera 21 can detect and use an image print service by a UPnP Control Point function. This service will be described in detail below.

A CPU 331 of the digital camera 21 detects based on the device specific information that the printer 148 can provide an image print service. Then, the digital camera 21 begins to use the image print service, and the user issues a print instruction by operating an operation unit 329 of the digital camera 21.

The operation unit 329 accepts an image file print instruction from the user. The image service controlling unit 331b (see FIG. 3) of the CPU 331 reads out an image file from a storage medium 29 or FLASH ROM 335 (see FIG. 3) based on the image file print instruction, and passes it to a wireless communication I/F unit 23. Also, the image service controlling unit 331b of the CPU 331 passes the image file print instruction to the wireless communication I/F unit 23. The wireless communication I/F unit 23 transmits the image file print instruction and the image file to the printer 148 via the network 45. That is, the image service controlling unit 331b of the CPU 331 controls the image print service provided by the printer 148 via the wireless communication I/F unit 23 and network 45.

The printer 148 receives the image file print instruction and the image file from the digital camera 21 via a network 45. In this way, the printer 148 acquires the image file print instruction and the image file. That is, the printer 148 acquires image data, information (attribute information) associated with the image data, and the image file print instruction. Then, a print unit (not shown) of the printer 148 can print image data captured by the digital camera 21 and its attribute information.

Figure 12:
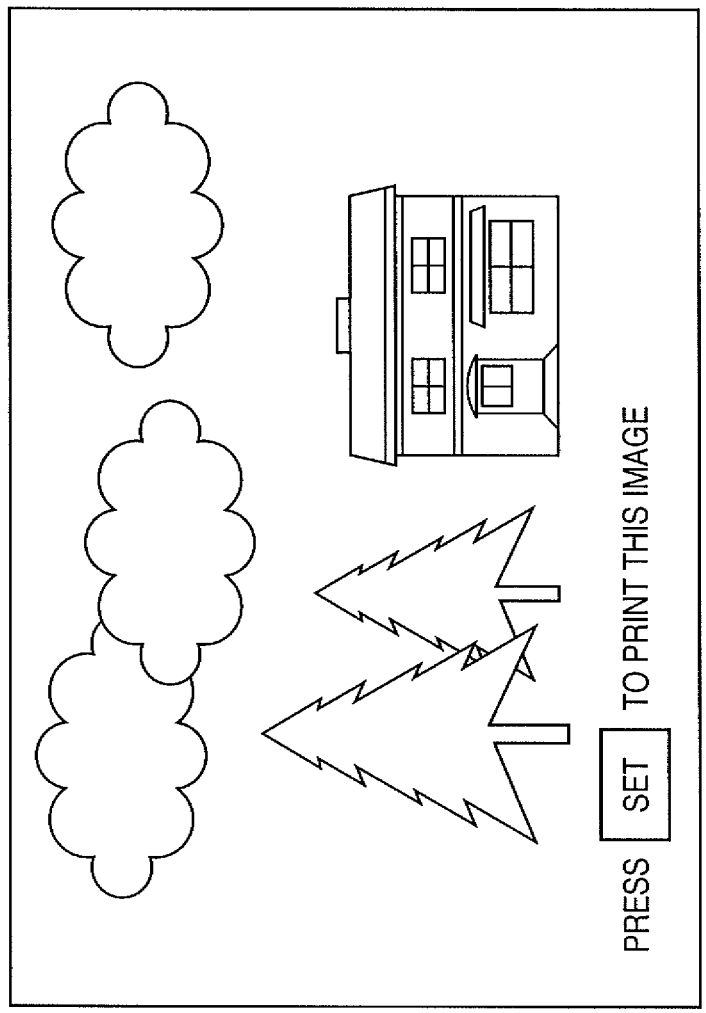
FIG. 12 shows an image displayed on the display unit.

Note that a window shown in FIG. 12 is displayed on the display unit 22 of the digital camera 21 in place of that shown in FIG. 8, thus simply notifying the user that he or she can issue a print instruction to the printer by operating the digital camera.

When the digital camera 21 cannot detect any image print service, it activates an image service providing unit 331a without activating the image service controlling unit 331b, thus providing the image browsing service, as in the first embodiment. The state transition of the digital camera 21 in this embodiment is nearly the same as that shown in FIG. 7 except that the image print service replaces the image display service.

According to this embodiment, the user can instruct to output image data to the printer by operating the operation unit 329 of the digital camera 21. On the other hand, when the user operates the remote controller of the television, he or she can display image data on the television, thus obtaining a desired processing result by an intuitive operation.

The above-described aspects of the present invention can be achieved by representing functions of image capturing apparatuses as a program, where the program is previously written on a recording medium, such as a ROM, inserting the ROM into an image capturing apparatus, and causing the image capturing apparatus to execute the program.

In such a case, a state where the program is read out from the ROM and is executed realizes the functions according to the above-described exemplary embodiments. Thus, the program and the ROM having the program recorded thereon constitute the present invention.

The program that realizes the functions of the image capturing apparatus according to the above-described exemplary embodiments may be provided after being recorded on a recording medium. For example, a semiconductor medium (such as a ROM or a nonvolatile memory), an optical recording medium (such as a DVD, an MO, an MD, or a CD), or a magnetic recording medium (such as a magnetic tape or a floppy disk) can be used as the recording medium. Alternatively, the above-described program may be provided by receiving the program having been stored in a storage device from a server apparatus computer through a communication network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-102128, filed Apr. 9, 2007, which is hereby incorporated by reference herein in its entirety.

What is claimed is:

1. A data management apparatus comprising:
a memory storing a program; and
a processor configured to execute the program stored in the memory, wherein when executing the program stored in the memory the processor comprises:
an operation unit configured to accept an instruction from a user;
a service providing unit configured to provide a first service which transmits image data to an external apparatus on a network, under the control of the external apparatus;
a service retrieval unit configured to detect the external apparatus providing a second service which processes, under the control of the data management apparatus, the image data transmitted from the data management apparatus;
a service controlling unit configured to control the external apparatus detected by the service retrieval unit such that the external apparatus provides the second service; and
a switching unit configured to switch among states of the data management apparatus,
wherein the states of the data management apparatus include:
(a) a first state that deactivates the service controlling unit and activates the service providing unit, wherein in the first state, the service providing unit provides an image service which enables the external apparatus to control the function of the data management apparatus,
(b) a second state that activates the service controlling unit and the service providing unit, wherein in the second state, the service controlling unit controls the image service of the external apparatus, and
(c) a third state that activates the service controlling unit and deactivates the service providing unit, wherein the service controlling unit controls the image service by the external apparatus,
wherein if the service retrieval unit does not detect the existence of an external apparatus capable of providing the second service, then the switching unit switches to the first state,
wherein if the service retrieval unit detects the existence of an external apparatus capable of providing the second service, then the switching unit switches to the second state or the third state, and wherein if the operation unit accepts an operation in the second state, then the switching unit switches to the third state, and wherein a processor and a memory are included in the data management apparatus upon receiving the instruction from the user.

2. The apparatus according to claim 1, wherein the operation unit accepts a display instruction of an image file if the service controlling unit controls the second service provided by the external apparatus, and wherein the service controlling unit controls to transmit the image file to be displayed on the external apparatus to the external apparatus via the network based on the display instruction of the image file.

3. The apparatus according to claim 2, wherein in the first state, at least part of the operation unit is disabled.

4. The apparatus according to claim 1, wherein the operation unit accepts a print instruction of an image file, if the service controlling unit controls the second service provided by the external apparatus, and wherein the service controlling unit controls to transmit the image file and the print instruction of the image file to the external apparatus via the network so that the external apparatus prints the image file.

5. The apparatus according to claim 1, wherein if the operation unit accepts an operation in the second state, the data management apparatus executes control of the external apparatus by the service controlling unit, and wherein if the operation unit accepts an operation in the first state, then the data management apparatus executes switching to the second state by the switching unit.

6. The apparatus according to claim 1, further comprising: a notification unit configured to notify, if a second service provided by the external apparatus is newly retrieved in the first state, that it is possible to switch to the second state.

7. The apparatus according to claim 1, further comprising: a detection unit configured to detect that the external apparatus on the network has disconnected from the network, wherein if the detection unit detects that the external apparatus which provides the second service has disconnected from the network, then the switching unit switches the second state to the first state.

8. The apparatus according to claim 1, wherein the service controlling unit is configured to display, on a display unit, an image file to be transmitted to the external apparatus, and wherein in the first state, the service controlling unit turns off the display of the image file on the display unit.

9. An apparatus-implemented method of controlling a data management apparatus, the method comprising:

providing, with the data management apparatus, a first service which transmits image data to an external apparatus on a network, under the control of the external apparatus;

detecting, with the data management apparatus, the external apparatus having a capability of providing a second service which processes, under the control of the data management apparatus, the image data transmitted from the data management apparatus;

controlling, with the data management apparatus, the external apparatus detected by the detecting step such that the external apparatus provides the second service; and switching among states of the data management apparatus, wherein the states of the data management apparatus include:

(a) a first state that deactivates the control of the external apparatus and activates the providing step, wherein in the first state, the service providing unit provides an image service which enables the external apparatus to control the function of the data management apparatus, (b) a second state that activates the control of the external apparatus and the providing step, wherein in the second state, the service controlling unit controls the image service of the external apparatus, and (c) a third state that activates the control of the external apparatus and deactivates the providing step, wherein the service controlling unit controls the image service by the external apparatus, wherein if the detecting step does not detect the existence of an external apparatus capable of providing the second service, then the switching step switches to the first state, wherein if the detecting step detects the existence of an external apparatus capable of providing the second service, then the switching step switches to the second state or the third state, and wherein if an operation unit of the data management apparatus accepts an operation in the second state, then the switching step switches to the third state upon receiving the instruction from the user.

* * * * *